United States Patent [19]

Enomoto et al.

[11] Patent Number: 4,996,545
[45] Date of Patent: Feb. 26, 1991

[54] APPARATUS FOR CORRECTING BLURRED IMAGE OF CAMERA USING ANGULAR ACCELERATION SENSOR AND ANGULAR ACCELERATION SENSOR

[75] Inventors: Shigeo Enomoto; Taminori Odano, both of Tokyo, Japan

[73] Assignee: Asahi Kogaku Kogyo Kabushiki Kaisha, Tokyo, Japan

[21] Appl. No.: 501,885

[22] Filed: Mar. 30, 1990

[30] Foreign Application Priority Data

Apr. 3, 1989 [JP] Japan .................................... 1-84318
Jan. 19, 1990 [JP] Japan ................................ 2-3623[U]

[51] Int. Cl.$^5$ ...................... G03B 39/00; G01P 15/08
[52] U.S. Cl. ......................................... 354/70; 354/76; 73/517 A; 350/500
[58] Field of Search ............... 73/515, 517 A; 354/65, 354/70, 76, 202, 354; 350/500; 358/227

[56] References Cited

U.S. PATENT DOCUMENTS 3,052,127  9/1962  De Mott ........................ 73/517 A
4,780,739 10/1988  Kawakami et al. .................. 354/70

FOREIGN PATENT DOCUMENTS

62-47012  2/1987  Japan .
63-53524  3/1988  Japan .
1047988  11/1966  United Kingdom .

Primary Examiner—L. T. Hix
Assistant Examiner—David M. Gray
Attorney, Agent, or Firm—Sandler, Greenblum & Bernstein

[57] ABSTRACT

An apparatus for correcting a blurred image has a blurred image correcting lens which constitutes at least part of a photographing lens of a camera. The correcting lens is supported to move in a direction substantially perpendicular to an optical axis of the photographing lens. A driver for driving the correcting lens and an angular acceleration sensor which detects the angular acceleration applied to the camera, to send a drive signal to the driver, to cancel an undesirable movement of the optical axis of the photgraphing lens are provided. The angular acceleration sensor includes a rotatable sensor arm having a rotational shaft in the center of the length of the sensor arm, permanent magnets provided at the opposite ends of the sensor arm, a magnetic sensor which is opposed to one of the permanent magnets, and a coil which is opposed to the other permanent magnet and which has a winding intersecting the magnetic flux of the other permanent magnet. The blurred image correcting lens is driven in accordance with the output of the coil.

21 Claims, 5 Drawing Sheets

APPARATUS FOR CORRECTING BLURRED IMAGE OF CAMERA USING ANGULAR ACCELERATION SENSOR AND ANGULAR ACCELERATION SENSOR

BACKGROUND OF THE INVENTION

1. Field of the Invention

The present invention relates to an apparatus for preventing blurred pictures in a camera using an angular acceleration sensor. The invention also relates generally to an angular acceleration sensor.

2. Description of the Related Art

Upon taking a picture with a camera held by a photographer, undesirable movement of the optical axis of the camera tends to occur due to camera-shake, as when the picture composition is incomplete, when a dark subject is taken at a slow shutter speed, or when a moving photographer takes a picture. The camera-shake results in a blurred picture. The camera-shake, which largely depends on a photographer's skill, can be eliminated to some extent by increasing the full-open aperture (decreasing the F-number) of lenses or a film sensitivity, thereby to increase the shutter speed.

In view of limits to access to such a camera-shake from a view point of software (photographer's skill) or hardware (decreasing F-number of lenses or increasing film sensitivity), apparatus for correcting blurred pictures in a camera has been proposed, in which, when a movement of the optical axis takes place due to camera-shake etc., a correcting lens is moved in a direction opposite to the direction of the movement of the optical axis to cancel the movement of the optical axis, thereby eliminating image blur.

In such a proposed blurred image correcting apparatus, it is necessary to detect angular deviation of the optical axis. To this end, a pair of angular acceleration sensors which are spaced from one another in the optical axis direction are provided to detect angular acceleration, as disclosed for example in Japanese Unexamined Patent Publication No. 62-47012. However, the incorporation of two such angular acceleration sensors into a camera to detect angular deviation (movement) in one direction makes the camera impracticable, expensive and complicated. This is one of the reasons that no camera having therein an image blur correcting apparatus is realized and yet available on the market. Furthermore, a conventional acceleration sensor is inevitably influenced by the acceleration of gravity. Accordingly, in order to actually incorporate the blurred image correcting apparatus into a camera, it is necessary to realize a smaller and more efficient angular acceleration sensor.

SUMMARY OF THE INVENTION

The primary object of the present invention is to provide a blurred image correcting apparatus which can correct a blurred image caused by a movement (deviation) of an optical axis of a camera due to camera-shake or the like.

Another object of the present invention is to provide a small and highly efficient angular acceleration sensor for a blurred image correcting apparatus of a camera, in which, when a camera-shake causing movement of the optical axis takes place during photographing, an image blur correcting lens is moved in a direction opposite to the direction of the camera-shake (movement of the optical axis) to absorb the movement of the optical axis, in accordance with a drive signal from the angular acceleration sensor.

To achieve the object mentioned above, according to the present invention, there is provided an apparatus for correcting a blurred image comprising a blurred image correcting lens which constitutes at least a part of a photographing lens of a camera. The correcting lens is supported so as to move in a direction substantially perpendicular to an optical axis of the photographing lens. A driver for driving the correcting lens, and an angular acceleration sensor which detects the angular acceleration applied to the camera to send a drive signal to the driver to cancel an undesirable movement of the optical axis of the photographing lens, is provided said angular acceleration sensor comprising a rotatable sensor arm having a rotational shaft in the vicinity of the center of the length of the sensor arm and permanent magnets at the opposite ends of the sensor arm, a magnetic sensor which is opposed to one of the permanent magnets, and a coil which is opposed to the other permanent magnet and which has a winding intersecting the magnetic flux of the other permanent magnet, whereby the blurred image correcting lens is driven in accordance with the output of the coil.

As the magnetic sensor a Hall effect device, or a Magnetic Resistance (MR) device (magnetoresistance device), etc., can be used. As is well known, the MR device is a magnetic sensor having characteristics in which a path of electric current supplied to a semiconductor in the magnetic field becomes long as the magnetic field increases, resulting in an increase in resistance (magnetoresistance effect).

The deviation (movement) of the optical axis due to camera-shake includes not only the angular deviation but also a parallel deviation. However, an image blur caused by the parallel deviation is extremely small in comparison with that caused by the angular deviation and is negligible. The reason will be described in detail later. Accordingly, the deviation of the optical axis referred to below is directed to the angular deviation.

The angular acceleration sensor according to the present invention has been developed for a blurred image correcting apparatus in a camera, but the application thereof is not limited to the blurred image correcting apparatus. Thus, the present invention is applicable also to an angular acceleration sensor per se.

Still another object of the present invention is to provide an angular acceleration sensor having a reduced leakage of magnetic flux from a permanent magnet, an increased sensitivity of the magnetic sensor, improved stability of operations and reduced noise.

To achieve the object mentioned above, according to another aspect of the present invention, there is provided an angular acceleration sensor comprising a rotatable sensor arm having a rotational shaft in the vicinity of the center of the length of the sensor arm and permanent magnets at the opposite ends of the sensor arm, a magnetic sensor which is opposed to one of the permanent magnets, and a coil which is opposed to the other permanent magnet and which has a winding intersecting the magnetic flux of the other permanent magnet.

According to still another aspect of the present invention, there is provided an angular acceleration sensor comprising an elongated rotatable sensor arm having a rotational shaft in the vicinity of the center of the length of the sensor arm and permanent magnets at the opposite ends of the sensor arm, a magnetic sensor which is opposed to one of the permanent magnets, a coil which is opposed to the other permanent magnet and which has a winding which intersects the magnetic flux of the other permanent magnet, and a pair of split yoke halves, each having an elongated plate portion and bent end portions which are bent toward the sensor arm at the opposite ends of the elongated plate portion.

The yoke halves are located in a symmetrical arrangement with respect to the sensor arm on the opposite sides of the sensor arm.

BRIEF DESCRIPTION OF THE DRAWINGS

The invention will be described below in detail with reference to the accompanying drawings, in which.

DESCRIPTION OF PREFERRED EMBODIMENTS

Generally speaking, a blurred image correcting apparatus of a camera detects angular acceleration applied to a camera to move an image blur correcting lens in a direction to cancel the movement of the optical axis in accordance with the detected angular acceleration. It is known to use a voice coil as a driver of the image blur correcting lens.

Figure 5A:
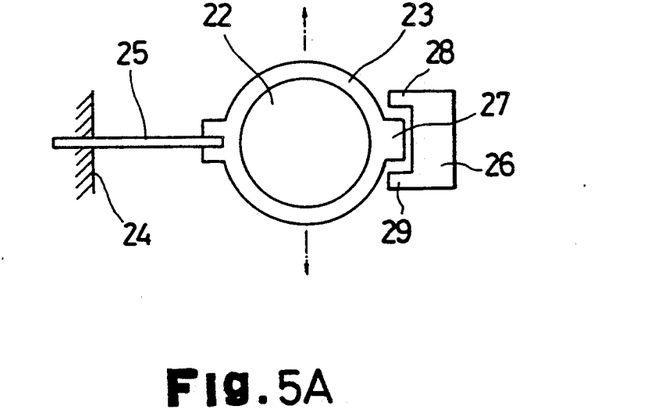
FIGS. 5A and 5B are a front elevational view and a plan view of a blurred image correcting apparatus in a camera, according to the present invention, respectively; and, FIGS. 6A and 6B are front elevational views of a blurred image correcting apparatus shown in different operational positions, according to another embodiment of the present invention.
Figure 5B:
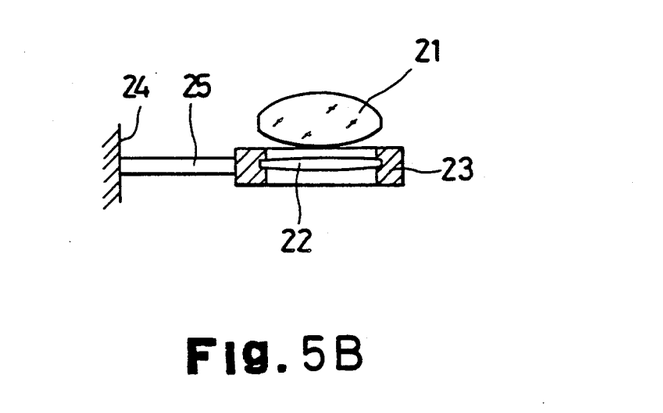

FIGS. 5A and 5B show a blurred image correcting apparatus of a camera according to the present invention, in which a bimorph cell plate is used as the driver, unlike the prior art.

In front of or in rear of a main photographing lens 21 of a camera is located a blurred image correcting lens (image blur eliminating lens) 22 which constitutes a photographing optical system together with the main photographing lens 21. The correcting lens 22 is secured to a correcting lens frame 23.

On one side of the correcting lens 22 a bimorph cell plate 25 is located. The plate extends in the horizontal direction and which is connected at its one end to a stationary portion 24 of a camera and at its opposite end (free end) to the correcting lens frame 23. The bimorph cell plate 25 deforms to be concave or convex, in accordance with the polarity of a drive voltage supplied thereto. The degree of deformation (displacement of the free end) of the bimorph cell plate 25 is determined by the value of the drive voltage supplied thereto. The optical axis of the main photographing lens 21 is coincidental with the optical axis of the correcting lens 22 when no drive voltage is supplied to the bimorph cell plate 22.

With the arrangement mentioned above, when the drive voltage is supplied to the bimorph cell plate 25, the correcting lens 22 can be moved upward and downward through the correcting lens frame 23.

Supposing that the main photographing lens 21 moves upwardly or downwardly due to camera-shake, so that the movement (deviation) of the optical axis thereof takes place, and an image is blurred in the same direction on the film. However, this image blur can be eliminated by supplying a drive voltage having a predetermined value and a predetermined polarity to absorb the deviation to the bimorph cell plate 25, so that the movement of the optical axis can be theoretically cancelled, thus resulting in no movement of the image on the film. The drive voltage to be supplied to the bimorph cell plate 25 is determined in accordance with the degree of camera-shake and the angular acceleration.

The excess displacement of the correcting lens frame 23 is prevented by a stop 26 which has a pair of upper and lower stop arms 28 and 29 corresponding to a stop projection 27 formed on the correcting lens frame 23. The stop projection 27 of the correcting lens frame 23 is placed between the stop arms 28 and 29 of the stop 26 which is supported by a stationary portion (not shown) of a lens barrel, so that the stop arms 28 and 29 prevent an excess deformation or displacement of the bimorph cell plate 25, for example due to an external shock applied to the camera.

To reduce the manufacturing cost of a camera, it is possible to use for example a single aspherical lens which functions both as the main photographing lens 21 and the blurred image correcting lens 22, instead of a separate main photographing lens 21 and blurred image correcting lens 22.

In the illustrated embodiment, the correcting lens 22 moves in the upward and downward directions in accordance with the direction of the camera movement. For special circumstances, it is possible to move the correcting lens 22 in other directions. Furthermore, it is possible to provide a pair of bimorph cell plates 25 extending in two directions perpendicular to each other with respect to the correcting lens frame 23 in order to move the correcting lens 22 in the two directions normal to each other.

Figure 6A:
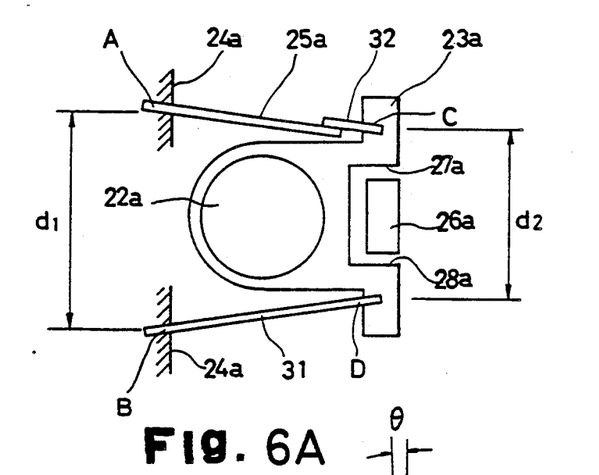
Figure 6B:
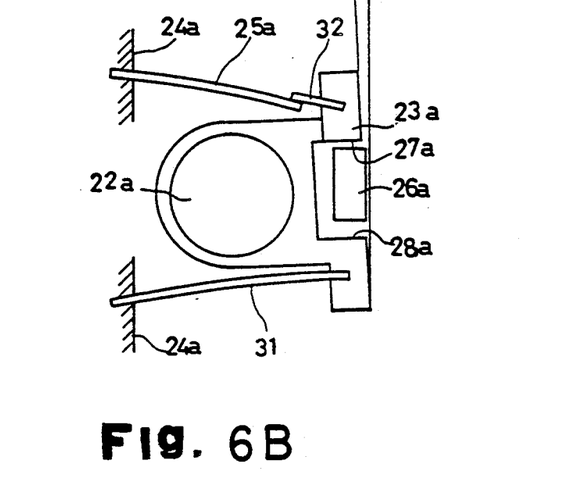

FIGS. 6A and 6B show another embodiment of a blurred image correcting apparatus using a bimorph cell plate according to the present invention. In the second embodiment shown in FIGS. 6A and 6B, the displacement of the bimorph cell plate is enlarged to be transmitted to the correcting lens, so that the size of the apparatus can be decreased.

The blurred image correcting lens 22a is secured to the correcting lens frame 23a. The bimorph cell plate 25a and a leaf spring member 31 are located above and below the correcting lens 22a, respectively. The bimorph cell plate 25a and the leaf spring member 31 are inclined substantially symmetrically with respect to the horizontal line passing the center of the correcting lens 22a. The bimorph cell plate 25a and the leaf spring member 31 are connected at one end to a stationary portion 24a of a lens barrel. The opposite end of the leaf spring member 31 is secured to the correcting lens frame 23a, so that the leaf spring member 31 forms a cantilever which supports the correcting lens 22a.

The bimorph cell plate 25a is connected at its opposite end to the correcting lens frame 23a through a spring plate 32 which has an elasticity smaller than that of the leaf spring 31. Namely, the spring plate 32 is connected at one end to the free end of the bimorph cell plate 25a and at the other end to the correcting lens frame 23a. The spring plate 32 ensures a smooth deformation of the bimorph cell plate 25a. Namely, if the bimorph cell plate 25a is directly connected to the correcting lens frame 23a without the spring plate 32, a large stress due to the deformation of the bimorph cell plate 25a may be produced in the bimorph cell plate 25a. This can be effectively prevented by the springy plate 32. Therefore, if the bimorph cell plate 25a is made of a material having a sufficient strength and a sufficient elasticity or flexibility, the springy plate 32 can be dispensed with, so that the bimorph cell plate 25a can be directly connected to the correcting lens frame 23a.

The stop member 26a which corresponds to the stop 26 in the first embodiment is located between upper and lower stop surfaces 27a and 28a of the correcting lens frame 23a, so that the stop member 26a can be engaged by the stop surfaces 27a and 28a to prevent the excess displacement of the bimorph cell plate 25a.

The second embodiment illustrated in FIGS. 6A and 6B is featured by:

(1) the securing ends A and B of the bimorph cell plate 25a and the leaf spring member 31 to the stationary portion 24a being located in one (i.e. left half in FIGS. 6A and 6B) of the two areas divided by a vertical plane including the optical axis of the lens;

(2) the connecting ends C and D of the bimorph cell plate 25a and the leaf spring member 31 to the correcting lens frame 23a (correcting lens 22a) being located in the other area (i.e. right half in FIGS. 6A and 6B) of the two areas divided by the vertical plane including the optical axis of the lens;

(3) the distance $d_1$ between the securing ends A and B of the bimorph cell plate 25a and the leaf spring member 31 being larger than the distance $d_2$ between the connecting ends C and D thereof; and, (4) the optical axis of the correcting lens 22a being located in the vicinity of a center point of the four ends A, B, C and D (i.e. an intersecting point of a line connecting the points A and D and a line connecting the points B and C).

In the arrangement illustrated in FIGS. 6A and 6B, when the drive voltage is supplied to the bimorph cell plate 25a, the latter deforms to move or displace the correcting lens 22a in the upward or downward direction. In FIG. 6B, the bimorph cell plate 25a deforms convexly upwardly, so that the correcting lens frame 23a moves downwardly to elastically bend the leaf spring member 31 as a whole. Since the distance $d_1$ between the securing ends A and B of the bimorph cell plate 25a and the leaf spring member 31 is larger than the distance $d_2$ between the connecting ends C and D thereof, the deformable end (right end) of the bimorph cell plate 25a comes close to the stationary portion 24a, whereas the free end (right end) of the leaf spring member 31 comes far away from the stationary portion 24a. As a result, the whole correcting lens frame 23a moves downwardly and is inclined left by an inclination angle $\theta$ with respect to the vertical direction. The displacement of the correcting lens 22a is larger than that of the displacement of the deformable end of the bimorph cell plate 25a. Namely, the displacement of the bimorph cell plate 25a is enlarged and transmitted to the correcting lens 22a. This makes it possible to reduce the lateral dimension of the apparatus, thereby to minimize the apparatus as a whole. In this embodiment, similar to the first embodiment mentioned before, it is possible to provide the main photographing lens 21 (FIG. 5B) with an optical axis which is coincidental with the optical axis of the correcting lens 22a when no drive voltage is supplied to the bimorph cell plate 25a.

The following discussion will be directed to an angular acceleration sensor 1 which sends a drive signal to the bimorph cell plate 25 (25a).

Figure 1:
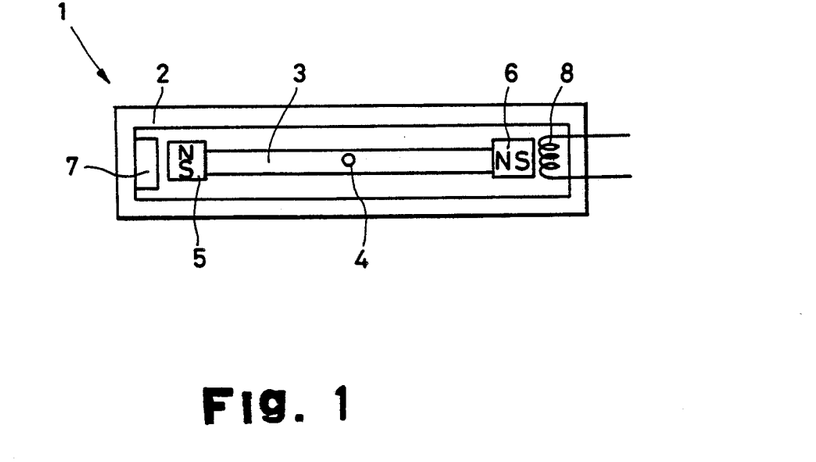
FIG. 1 is a sectional view of an angular acceleration sensor according to a first embodiment of the present invention.

In FIG. 1 which shows a first embodiment of the angular acceleration sensor 1, a cylindrical sensor casing 2 has therein an elongated sensor arm 3 made of a high permeability material. The sensor arm 3 is supported by a rotational shaft 4 at a balanced position in the center thereof in the longitudinal direction. The rotational shaft 4 is comprised of a bearing having a least rotation resistance, such as a pivot bearing, so that the sensor arm 3 is rotatably balanced about the shaft 4.

The sensor arm 3 is provided on its opposite ends with permanent magnets 5 and 6. The casing 2 has at its one end a magnetic sensor 7, such as Hall effect device, MR device or the like, which is positioned opposite the permanent magnet 5, and at the other end thereof a coil 8 which is positioned opposite the permanent magnet 6. The permanent magnets 5 and 6 are made of strongly magnetic material, such as rare-earth magnets. The permanent magnet 5 is magnetized in the direction along the magnetic sensor 7, i.e. in the vertical direction in FIG. 1. On the other hand, the permanent magnet 6 is magnetized in the longitudinal direction of the sensor arm 3. The permanent magnet 6 and the coil 8 are placed so that the magnetic flux of the permanent magnet 6 intersects the winding of the coil 8. That is, when electric current is supplied to the coil 8, a rotational force on the sensor arm 3 is produced.

The magnetic sensor 7 outputs no signal when the permanent magnet 5 is located opposite the center of the front surface of the magnetic sensor 7, that is, when sensor arm 3 is in the balanced position shown in FIG. 1. When the sensor arm 3 rotates, the permanent magnet 5 is moved, so that the output corresponding to the direction of the movement and the displacement of the permanent magnet 7 is issued from the magnetic sensor 7.

The casing 2 restricts the rotational movement of the sensor arm 3 so as to maintain the magnetic field of the permanent magnets 5 and 6 within the operational range of the magnetic sensor 7 and the coil 8.

Figure 2A:
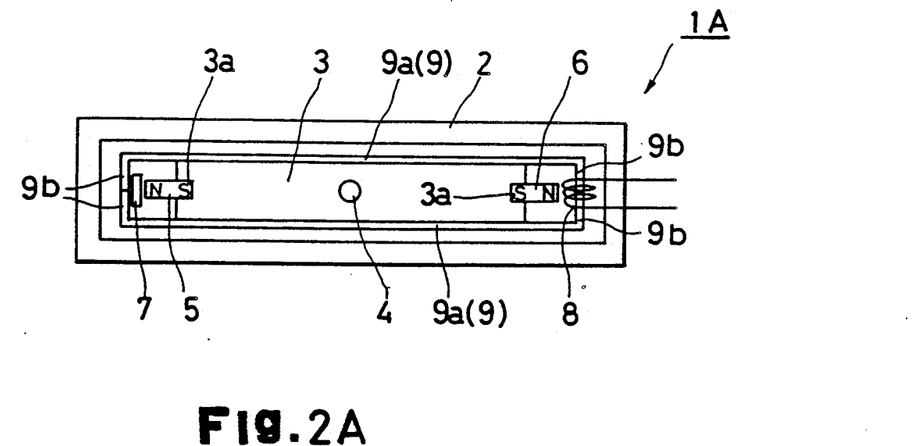
FIG. 2A is a sectional view of an angular acceleration sensor according to a second embodiment of the present invention.
Figure 2B:
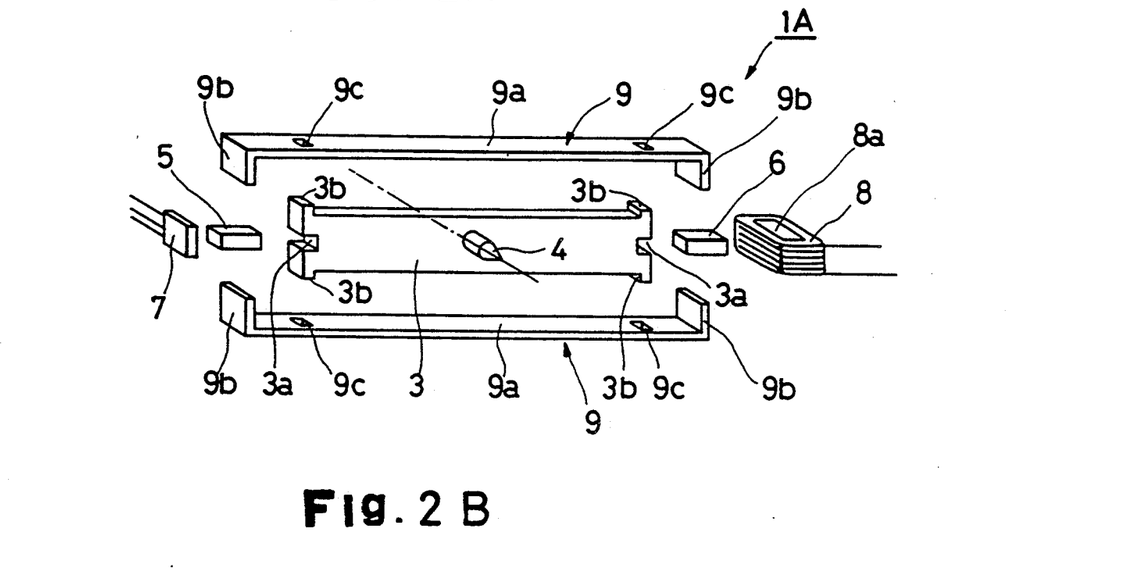
FIG. 2B is an exploded perspective view of an angular acceleration sensor shown in FIG. 2A.

FIGS. 2A and 2B show another embodiment of the angular acceleration sensor 1A of the present invention. In this embodiment, in addition to the components of the above-mentioned first embodiment shown in FIG. 1, a pair of magnetic induction yoke members 9 consisting of split identical yoke halves are provided on and secured to the opposite sides of the sensor arm 3. The improvement of the second embodiment is also directed to the mechanism for securing the yoke members 9 to the sensor arm 3.

Each of the yoke halves 9 is of generally angular U-shape and has an elongated plate portion 9a which extends along the length of the sensor arm 3 and bent end portions 9b which are bent toward the sensor arm 3 at the opposite ends of the elongated plate portion 9a. The yoke halves 9 are located in a symmetrical arrangement with respect to the longitudinal center line of the sensor arm 3. Each of the elongated plate portion 9a has a pair of mounting holes 9c and the sensor arm 3 has projections 3b which can be fitted in the mounting holes 9c. The pair of yoke halves 9 are secured to the sensor arm 3 by the engagement of the projections 3b into the corresponding mounting holes 9c and the magnetic attraction of the permanent magnets 5 and 6. In the assembled state, the bent ends 9b of the yoke halves 9 come into contact with each other, and the bent ends 9b on the one end side of the sensor arm 3 extend through the hollow portion 8a (FIG. 2B) of the coil 8 and the bent ends 9b on the other end side of the sensor arm 3 are located behind the magnetic sensor 7. Namely, the magnetic sensor 7 is located within a pair of yoke halves 9 which are generally rectangular as a whole when interconnected.

The yoke members 9 which are secured to the sensor arm 3 to surround the permanent magnets 5 and 6 can reduce the leakage of magnetic flux from the permanent magnets to effectively use the magnetic flux. In particular, since almost all of the magnetic flux from the permanent magnet 6 intersects the winding of the coil 8, as mentioned before, even a small current supplied to the coil 8 ensures the stable operation thereof. Furthermore, since the magnetic flux passing the magnetic sensor 7 is increased, the sensitivity of the magnetic sensor 7 becomes high, and accordingly, it is possible to reduce the amplification of the control circuit, thus resulting in an increased stability of the operations and a reduced noise. This also makes it possible to use a power source of low voltage and small capacity.

Due to the reduced leakage magnetic flux, approach of an iron member to the apparatus has a minimal influence on the apparatus.

Furthermore, the split yoke halves 9 contribute to an easy assembly and simple construction of the apparatus.

In the second embodiment illustrated in FIGS. 2A and 2B, the sensor arm 3 is provided on its opposite ends with magnet inserting grooves 3a in which the corresponding permanent magnets 5 and 6 are inserted. The permanent magnets 5 and 6 are preferably made as strong magnets, such as rare-earth magnets. When there is a precise fit between the permanent magnets 5, 6 and the magnet inserting grooves 3a, no special adhesive is necessary to secure the permanent magnets 5 and 6 to the sensor arm 3 which is preferably made of a material having a high permeability, as they are secured with the help of the magnetic attraction.

Figure 4:
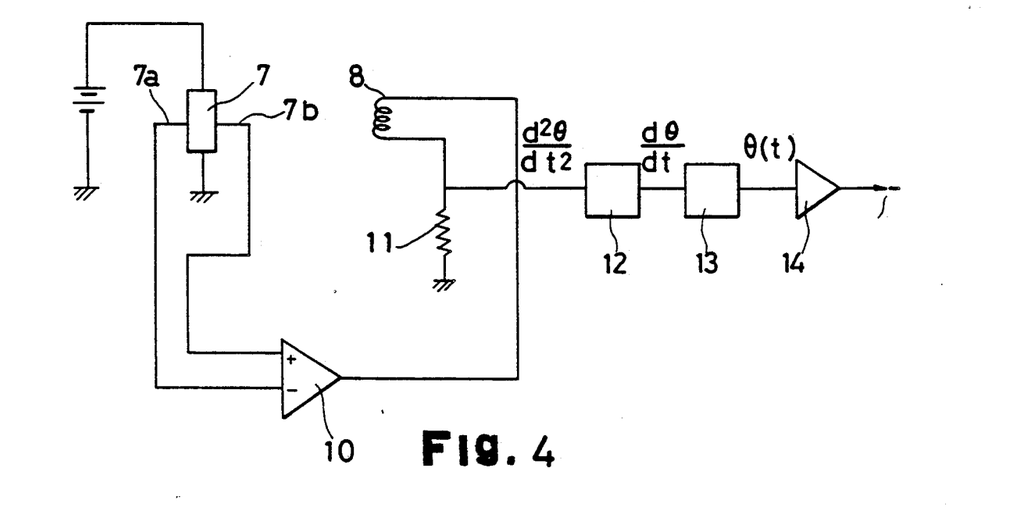
FIG. 4 is a diagram of a drive circuit of an angular acceleration sensor according to the present invention.

FIG. 4 shows a drive circuit of the angular acceleration sensor 1 (1A) including the magnetic sensor 7 and the coil 8.

In FIG. 4, the outputs corresponding to the direction of the movement of the permanent magnet 5 and the displacement thereof are issued from the output terminals 7a and 7b of the magnetic sensor 7 to be input to a differential amplifier 10. The output of the differential amplifier 10 is input to the coil 8, so that the voltage between opposite ends of a resistance 11 connected to the coil 8 is supplied to the integration circuits 12 and 13 and the bimorph cell plate 25 (25a) through an amplifier 14.

Figure 3:
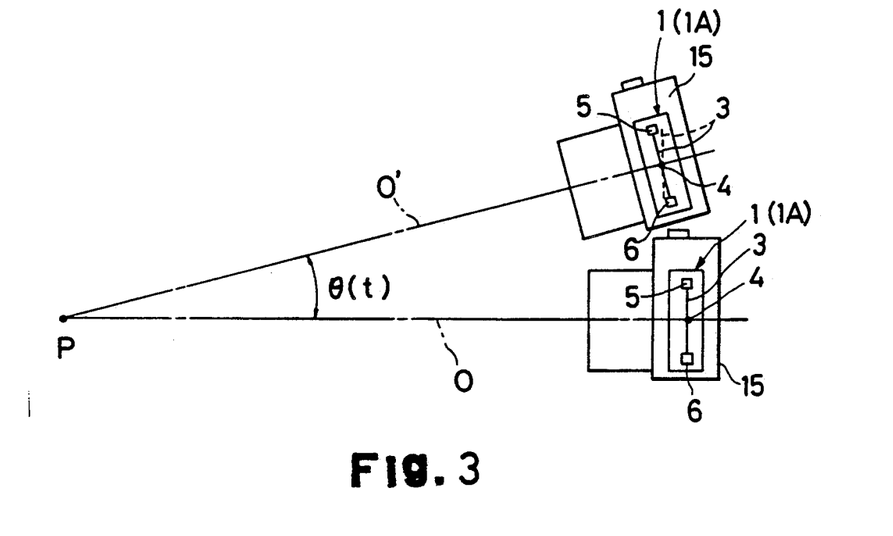
FIG. 3 is a side elevational view of a camera showing an angular acceleration as shown in FIG. 1 or FIGS. 2A and 2B.

The angular acceleration sensor 1 (1A) is incorporated in a camera 15, in such a way that when a picture is taken by the camera 15 which is horizontally positioned, the sensor arm 3 is vertically positioned, and the rotational shaft 4 is perpendicular to the optical axis, as shown in FIG. 3.

Supposing that the optical axis 0 is moved to an optical axis 0' by an angle $\theta(t)$ which is a function of time due to a rotational movement of the camera (camera-shake) about the point P for certain reason, when no current flows in the coil 8 of the angular acceleration sensor 1 (1A), the sensor arm 3 tends to rotate in order to maintain the vertical position perpendicular to the ground due to the inertia, as shown at an imaginary line. Note that the deviation angle $\theta(t)$ is exaggerated in FIG. 3. However, in the present invention, the sensor arm 3 is moved to maintain the position vertical to the optical axis by the drive circuit shown in FIG. 4. Namely, the output proportional to the angular acceleration $d^2\theta/dt^2$ of the deviation angle $\theta(t)$ can be obtained. The reason thereof is as follows.

When the deviation angle $\theta(t)$ occurs, as shown in FIG. 3, the permanent magnet 5 is deviated from the center of the front surface of the magnetic sensor 7, so that a potential difference is produced between the output terminals 7a and 7b of the magnetic sensor 7. The potential difference is input to the differential amplifier 10 to be amplified. The amplified voltage is input to the circuit including the coil 8 and the resistance 11 connected to the coil 8 in series. By the current flowing in the coil 8, the rotational force is applied to the sensor arm 3 through the permanent magnet 6, so that the permanent magnet 5 is moved back to the initial position in which it faces the center of the front surface of the magnetic sensor 7. Namely, a voltage proportional to the current value necessary for maintaining the permanent magnet 5 to face the center of the front surface of the magnetic sensor 7 against the inertia of the sensor arm 3 due to the deviation angle $\theta(t)$ is produced between the opposite ends of the resistance 11 connected in series to the coil 8. The voltage is in proportion to the angular acceleration $d^2\theta/dt^2$ of the deviation angle $\theta(t)$ of the optical axis. The voltage is then integrated in the integration circuits 12 and 13, so that the output proportional to the deviation angle $\theta(t)$ of the optical axis can be obtained at the output terminal of the integration circuit 13. The output is then amplified by the amplifier 14, and is input to the bimorph cell plate 25 shown in FIGS. 5A and 5B or to the bimorph cell plate 25a shown in FIGS. 6A and 6B. As a result, the correcting lens 22 (22a) is moved by a displacement corresponding to the deviation angle $\theta(t)$ of the optical axis to cancel or absorb the deviation angle $\theta(t)$ or at least to reduce the deviation angle $\theta(t)$.

As mentioned before, the movement of the optical axis due to camera-shake includes not only the angular deviation, but also a parallel deviation (i.e., translation), but the latter is negligible. The reason is as follows.

Supposing that under the photographing conditions in which the focal length f is 40 mm (f=40 mm) and the object distance L is 4 m (L=4000 mm), the optical axis is moved in parallel by the displacement d(=5 mm) during photographing, the deviation of the image on the film is given by:

$$d \cdot f / L = 0.05 \text{ mm}$$

In practice, there is almost never parallel movement of the optical axis as large as 5 mm due to camera-shake. Furthermore, a 0.05 mm of deviation an image is practically negligible.

On the other hand, if there is an angular deviation of the optical axis by $\theta = 1°$, under the same photographing conditions as mentioned above, the deviation of an image on the film, regardless of the object distance, is as follows:

$$f \cdot \theta \cdot \pi / 180 = 0.70 \text{ mm}$$

An angular deviation θ = 1° of the optical axis due to camera-shake frequently occurs during an actual photographing. If the image deviation on the film is above 0.08 mm ~0.10 mm, an unacceptable blurred image is produced.

As can be understood from the above discussion, it is practically very important to correct the blurred image caused by the angular deviation of the optical axis, but an image blur caused by the parallel deviation of the optical axis is negligible.

According to the angular acceleration sensor of the present invention, the angular deviation of the optical axis can be detected by a single sensor, unlike the prior art as disclosed in Japanese Unexamined Patent Publication No. 62-47012 in which two acceleration sensors are required. Therefore, the construction of the angular acceleration sensor can be simplified in the present invention. Furthermore, since the angular acceleration can be detected without being influenced by the gravitational acceleration, there is no difference in posture due to different postures of the camera. In addition, in the present invention, the processing of the electrical signals can be simplified.

The above discussion has been mainly directed to the angular deviation of the optical axis in the vertical direction, since the deviations (angular deviations) of the optical axis which are caused during photographing are almost always those caused in the vertical direction when the shutter button is pushed down. However, in order to detect the lateral deviation (angular deviation) of the optical axis, it is possible to place the angular acceleration sensor 1 (1A) for example at the bottom of the camera or the vicinity thereof in such a way that the rotational shaft 4 is normal to the optical axis 0 and the ground, so that the correcting lens 22 (22a) can be driven by a pair of bimorph cell plates 25 (25a) perpendicular to each other.

The angular acceleration sensor 1 (1A) of the present invention is applicable to a device other than the blurred image correcting apparatus of a camera, as mentioned above.

For instance, the angular acceleration sensor 1 can be used as a sensor for preventing the pitching and rolling of a ship or boat (including a model or miniature thereof). In this application, the outputs of the amplifier 14 are output as a function of the angular acceleration.

As can be seen from the foregoing, according to the present invention, the image blur due to camera-shake can be eliminated. In particular, the single angular acceleration sensor which sends the drive signals to the correcting lens can detect the angular deviation of the optical axis. In theory, since only a very slight rotational displacement of the sensor arm about the rotational shaft is necessary during operation, the thickness of the apparatus can be minimized, so that the apparatus can be easily incorporated in the camera without substantially increasing the size of the camera. Consequently, an inexpensive and small camera incorporating the blurred image correcting apparatus can be realized.

Furthermore, the yoke members which are provided on the sensor arm to surround the permanent magnets reduce the leakage of magnetic flux from the permanent magnets to effectively utilize the magnetic flux. In particular, since almost all of the magnetic flux from the permanent magnet adjacent to the coil intersect the winding of the coil, even if the current supplied to the coil is small, the apparatus can be operated.

Furthermore, since the magnetic flux passing through the magnetic sensor is increased and since the sensitivity of the magnetic sensor becomes high, the amplification of the drive circuit can be reduced, thus resulting in an increased stability of the operations and reduced noise. This also makes it possible to use a power source of low voltage and small capacity. Due to the reduced leakage magnetic flux, approach of an iron member to the apparatus has a minimal influence on the apparatus.

Furthermore, the split yoke halves contribute to an easy assembly and simple construction of the apparatus.

Finally, since the angular acceleration sensor is small, it can be easily incorporated in a compact blurred image correcting apparatus, in which the correcting lens can be driven in accordance with the angular acceleration thus detected to effectively eliminate an image blur.

We claim:

1. An apparatus for correcting a blurred image comprising:
   a blurred image correcting lens which constitutes at least a part of a photographing lens of a camera and which is supported so as to move in a direction substantially perpendicular to the optical axis of the photographing lens;
   a driver for driving the correcting lens;
   an angular acceleration sensor adapted to detect the angular acceleration applied to said camera to send a drive signal to said driver to cancel movement of the optical axis of the photographing lens;
   said angular acceleration sensor comprising a rotatable sensor arm having a rotational shaft centrally positioned along the length of said sensor arm and permanent magnets at the opposite ends of said sensor arm, a magnetic sensor which is mounted opposite one of said permanent magnets, a coil which is mounted opposite to the other said permanent magnet, said coil comprising a winding intersecting the magnetic flux of said other permanent magnet;
   whereby the blurred image correcting lens is driven in accordance with the output of said coil.

2. A blurred image correcting apparatus according to claim 1, wherein said magnetic sensor comprises a Hall effect device.

3. A blurred image correcting apparatus according to claim 1, wherein said magnetic sensor is comprises an MR device.

4. A blurred image correcting apparatus according to claim 1, wherein said angular acceleration sensor further comprises a yoke member fixed to said sensor arm to surround said sensor arm.

5. A blurred image correcting apparatus according to claim 1, wherein said angular acceleration sensor further comprises a casing in which said sensor arm is housed to restrict the rotational movement of said sensor arm.

6. A blurred image correcting apparatus according to claim 1, wherein said driver of said blurred image correcting lens comprises a bimorph cell plate which is immovably secured at one end and is operatively connected at the opposite end to said blurred image correcting lens, and a controller which supplies a drive voltage to said bimorph cell plate to move said cell plate in a direction to cancel the movement of the optical axis of said photographing lens in accordance with the output of said angular acceleration sensor.

7. A blurred image correcting apparatus according to claim 1, wherein said driver of the blurred image correcting lens comprises a bimorph cell plate and a leaf spring member which are immovably secured at their one end in one of two areas divided by a plane including the optical axis of the photographing lens and which are connected at their opposite ends to the blurred image correcting lens in the other of said two areas, and a controller which supplies a drive voltage to said bimorph cell plate to move the cell plate in a direction to cancel said movement of the optical axis of said photographing lens in accordance with the output of said angular acceleration sensor.

8. A blurred image correcting apparatus according to claim 7, wherein the distance between the ends of said bimorph cell plate and said leaf spring member in said one area is larger than the distance between the ends of said bimorph cell plate and the leaf spring member in said other area.

9. A blurred image correcting apparatus according to claim 8, further comprising a spring-member which connects said bimorph cell plate and said blurred image correcting lens.

10. An angular acceleration sensor comprising a rotatable sensor arm having a rotational shaft centrally positioned along the length of said sensor arm and permanent magnets at the opposite ends of said sensor arm, a magnetic sensor which is opposite one of said permanent magnets, and a coil which is opposite the other of said permanent magnets and comprising a winding intersecting the magnetic flux of the other said permanent magnet.

11. An angular acceleration sensor according to claim 10, wherein said magnetic sensor comprises a Hall effect device.

12. An angular acceleration sensor according to claim 10, wherein said magnetic sensor comprises an MR device.

13. An angular acceleration sensor according to claim 10, wherein said angular acceleration sensor further comprises a yoke member fixed to said sensor arm to surround said sensor arm.

14. An angular acceleration sensor apparatus according to claim 10, wherein said angular acceleration sensor further comprises a casing in which said sensor arm is housed to restrict the rotational movement of said sensor arm.

15. An angular acceleration sensor comprising:
an elongated rotatable sensor arm having a rotational shaft centrally positioned along the length of said sensor arm and permanent magnets at the opposite ends of said sensor arm;
a magnetic sensor opposite one of said permanent magnets;
a coil opposite the other said permanent magnet and which has a winding which intersects the magnetic flux of the other said permanent magnet; and,
a pair of split yoke halves, each said split yoke halves having an elongated plate portion and bent end portions which are bent toward said sensor arm at the opposite ends of said elongated plate portion;
said yoke halves being located in a symmetrical arrangement with respect to said sensor arm on the opposite sides of said sensor arm.

16. An angular acceleration sensor according to claim 15, wherein said yoke halves are secured to said sensor arm, so that the opposed ends of the yoke halves on one end side of the sensor arm come into contact with each other outside the magnetic sensor and the opposed ends of the yoke halves on the other end side of the sensor arm come into contact with each other in the winding of the coil.

17. An apparatus for correcting a blurred image comprising:
a blurred image correcting lens which constitutes at least a part of a photographing lens of a camera and which is supported so as to move in a direction substantially perpendicular to the optical axis of the photographing lens; and,
an angular acceleration sensor which detects the angular acceleration applied to the camera to send a drive signal to said blurred image correcting lens to cancel movement of the optical axis of the photographing lens;
said angular acceleration sensor comprising a rotatable sensor arm having a rotational shaft positioned centrally along the length of the sensor arm and permanent magnets at the opposite ends of said sensor arm, a magnetic sensor opposite one of said permanent magnets, a coil opposite the other said permanent magnet and which has a winding intersecting the magnetic flux of the other said permanent magnet, and a pair of split yoke halves, each of said split yoke halves having an elongated plate portion extending along said sensor arm and bent end portions which are bent toward said sensor arm at the opposite ends of said elongated plate portion; and
said yoke halves are located in a symmetrical arrangement with respect to said sensor arm on the opposite sides of said sensor arm.

18. A blurred image correcting apparatus according to claim 17, wherein said yoke halves are secured to said sensor arm, so that the opposed ends of said yoke halves on one end side of said sensor arm come into contact with each other outside said magnetic sensor and the opposed ends of said yoke halves on the other end side of said sensor arm come into contact with each other in said winding of said coil.

19. An apparatus for correcting a blurred image comprising:
a blurred image correcting lens which constitutes at least a part of a photographing lens of a camera and which is supported so as to move in a direction substantially perpendicular to an optical axis of the photographing lens; and,
a bimorph cell plate which is immovably secured at one end and which is functionally connected to said blurred image correcting lens; and
a drive voltage is supplied to said bimorph cell plate to move the blurred image correcting lens in a direction to cancel movement of the optical axis of the photographing lens.

20. An apparatus for correcting a blurred image comprising:
a blurred image correcting lens which constitutes at least a part of a photographing lens of a camera and which is supported so as to move in a direction substantially perpendicular to an optical axis of the photographing lens; and
a bimorph cell plate and a leaf spring member which are each immovably secured at one end in one of two areas divided by a plane including the optical axis of the photographing lens and which are connected at opposite ends to said blurred image correcting lens in the other of said two areas;
wherein the distance between the ends of said bimorph cell plate and said leaf spring member in said one area is larger than the distance between said ends of said bimorph cell plate and said leaf spring member in said the other said area; and a drive voltage is supplied to said bimorph cell plate to move said blurred image correcting lens in a direction to cancel movement of the optical axis of the photographing lens.

21. A blurred image correcting apparatus according to claim 20, further comprising a spring-member which connects the bimorph cell plate and the blurred image correcting lens.

* * * * *

UNITED STATES PATENT AND TRADEMARK OFFICE
CERTIFICATE OF CORRECTION

PATENT NO. : 4,996,545
DATED : February 26, 1991
INVENTOR(S) : S. ENOMOTO et al.

It is certified that error appears in the above-indentified patent and that said Letters Patent is hereby corrected as shown below:

Fig. 4, insert "to Biomorph cell plate 25 (25a)" with lead line directed towards the output of the amplifier 14 as shown on the attached sheet;

Signed and Sealed this

Twenty-fifth Day of February, 1997

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 4,996,545
DATED : February 26, 1991
INVENTOR(S) : S. ENOMOTO et al.

It is certified that error appears in the above-indentified patent and that said Letters Patent is hereby corrected as shown below:

column 2, line 14, insert ---.--- after "provided";

column 2, line 14, change "said" to ---The---;

column 2, line 15, change "comprising" to ---comprises---;

column 5, line 10, change "springy" to ---spring---;

column 5, line 13, change "springy" to ---spring---;

column 10, line 46 (claim 3, line 2), delete "is";

column 11, line 8 (claim 7, line 10), change "the" to ---said---;

column 11, line 9 (claim 7, line 11), change "said" to ---the---;

column 11, line 19 (claim 9, line 2), delete "-" after "spring"; and column 14, line 4 (claim 21, line 2), delete "-" after "spring".

Fig. 4